(12) United States Patent
Bak

(10) Patent No.: US 9,054,551 B2
(45) Date of Patent: Jun. 9, 2015

(54) BATTERY CHARGING METHOD AND BATTERY PACK USING THE SAME

(75) Inventor: Chilseong Bak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 318 days.

(21) Appl. No.: 13/594,438

(22) Filed: Aug. 24, 2012

(65) Prior Publication Data
US 2013/0141033 A1   Jun. 6, 2013

(30) Foreign Application Priority Data
Dec. 1, 2011 (KR) .......................... 10-2011-0127855

(51) Int. Cl.
*H02J 7/00* (2006.01)
*H02J 7/04* (2006.01)

(52) U.S. Cl.
CPC ..................................... *H02J 7/042* (2013.01)

(58) Field of Classification Search
CPC ....... H02J 7/0042; H02J 7/027; H02J 7/0081; H02J 7/078
USPC .................. 320/106, 128, 132, 137, 139, 149
See application file for complete search history.

(56) References Cited

U.S. PATENT DOCUMENTS 7,737,659 B2 *   6/2010   Morioka ........................ 320/128
2008/0290839 A1   11/2008   Hayashi

FOREIGN PATENT DOCUMENTS

JP   2008-295171   12/2008
JP   2010-160955   7/2010
KR   10-2007-0105014 A   10/2007

OTHER PUBLICATIONS

Full English Machine Translation of JP 2010-160955, 39 pages.

* cited by examiner

*Primary Examiner* — Vuthe Siek
(74) *Attorney, Agent, or Firm* — Christie, Parker & Hale, LLP

(57) ABSTRACT

A battery charging method and a battery pack using the same. The method including: counting an increased number of charging and discharging cycles of the battery for a first reference time; determining a user type of the battery according to the counted increased number of charging and discharging cycles; and reducing a charging voltage of the battery from a first reference voltage to a second reference voltage.

13 Claims, 4 Drawing Sheets

BATTERY CHARGING METHOD AND BATTERY PACK USING THE SAME

CROSS-REFERENCE TO RELATED APPLICATION

This application claims priority to and the benefit of Korean Patent Application No. 10-2011-0127855, filed on Dec. 1, 2011, in the Korean Intellectual Property Office, the disclosure of which is incorporated herein in its entirety by reference.

BACKGROUND

1. Field

One or more embodiments of the present invention relate to a battery charging method and a battery pack using the same.

2. Description of Related Art

An increasing use of portable electronic devices, for example, mobile phones, digital cameras, or notebooks, has led to development of batteries as a power source for driving the portable electronic devices. In general, a battery may be provided in the form of a battery pack together with a protection circuit for controlling charging and discharging of a battery. Research on a protection circuit is being performed so as to charge or discharge a battery efficiently and stably.

SUMMARY

One or more embodiments of the present invention include a battery charging method of determining a user type of a battery, adjusting a charging voltage of the battery according to the determined user type of the battery, and increasing an availability time of the battery while maintaining an initial capacity of the battery, and a battery pack using the battery charging method.

Additional aspects will be set forth, in part, in the description that follows and, in part, will be apparent from the description, or may be learned by practice of the presented embodiments.

According to one or more embodiments of the present invention, provided is a method of controlling charging of a battery, the method including: counting an increased number of charging and discharging cycles of the battery for a first reference time; determining a user type of the battery according to the counted increased number of charging and discharging cycles; and reducing a charging voltage of the battery from a first reference voltage to a second reference voltage in a stepwise manner according to the determined user type.

The determining of the user type may include: if the increased number of charging and discharging cycles of the battery for the first reference time is greater than N, determining the user type to be a battery user type in which an electric device is driven by the battery; and if the increased number of charging and discharging cycles of the battery for the first reference time is smaller than N, determining the user type to be an AC user type in which the electric device is driven by an alternating current using an adapter, wherein N is a natural number.

The first reference voltage may be a voltage for fully charging the battery.

The second reference voltage may be a charging voltage when a total number of charging and discharging cycles of the battery is greater than or equal to a reference number of cycles.

The second reference voltage may be a charging voltage when an availability time of the battery is greater than or equal to a second reference time.

The method may further include: if the determined user type is the battery user type and a total number of the charging and discharging cycles of the battery is greater than or equal to the reference number of cycles, maintaining a constant charging voltage and stopping the operation of reducing the charging voltage of the battery.

The method may further include: if the determined user type is the AC user type and an availability time of the battery is greater than or equal to the second reference time, maintaining a constant charging voltage and stopping the operation of reducing the charging voltage of the battery.

According to one or more embodiments of the present invention, a battery pack includes: a battery; a voltage adjustment unit for adjusting a charging voltage of the battery; and a battery management unit for determining a user type of the battery, and outputting a control signal for reducing the charging voltage of the battery in a stepwise manner according to the determined user type to the voltage adjustment unit.

The determined user type may be a battery user type when an increased number of charging and discharging cycles of the battery for a first reference time is greater than N, the determined user type may be an AC user type when the increased number of charging and discharging cycles of the battery for the first reference time is smaller than N, and N may be a natural number.

The battery management unit may be configured to output a control signal for maintaining a constant charging voltage when the determined user type is the battery user type and a total number of charging and discharging cycles of the battery is greater than or equal to a reference number of cycles.

The battery management unit may be configured to output a control signal for maintaining a constant charging voltage when the determined user type is the AC user type and an availability time of the battery is greater than or equal to a second reference time.

The battery management unit may include: a timer for measuring an availability time of the battery; a counter for counting charging and discharging cycles of the battery; a user type determiner for determining the user type of the battery from an increased number of charging and discharging cycles of the battery counted by the counter for a first reference time; and a controller for outputting the control signal for reducing the charging voltage of the battery from a first reference voltage to a second reference voltage in the stepwise manner according to the determined user type to the voltage adjustment unit.

The first reference voltage may be a voltage for fully charging the battery.

The second reference voltage may be a charging voltage when a total number of charging and discharging cycles of the battery is greater than or equal to a reference number of cycles.

The second reference voltage may be a charging voltage when the availability time of the battery is greater than or equal to a second reference time.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
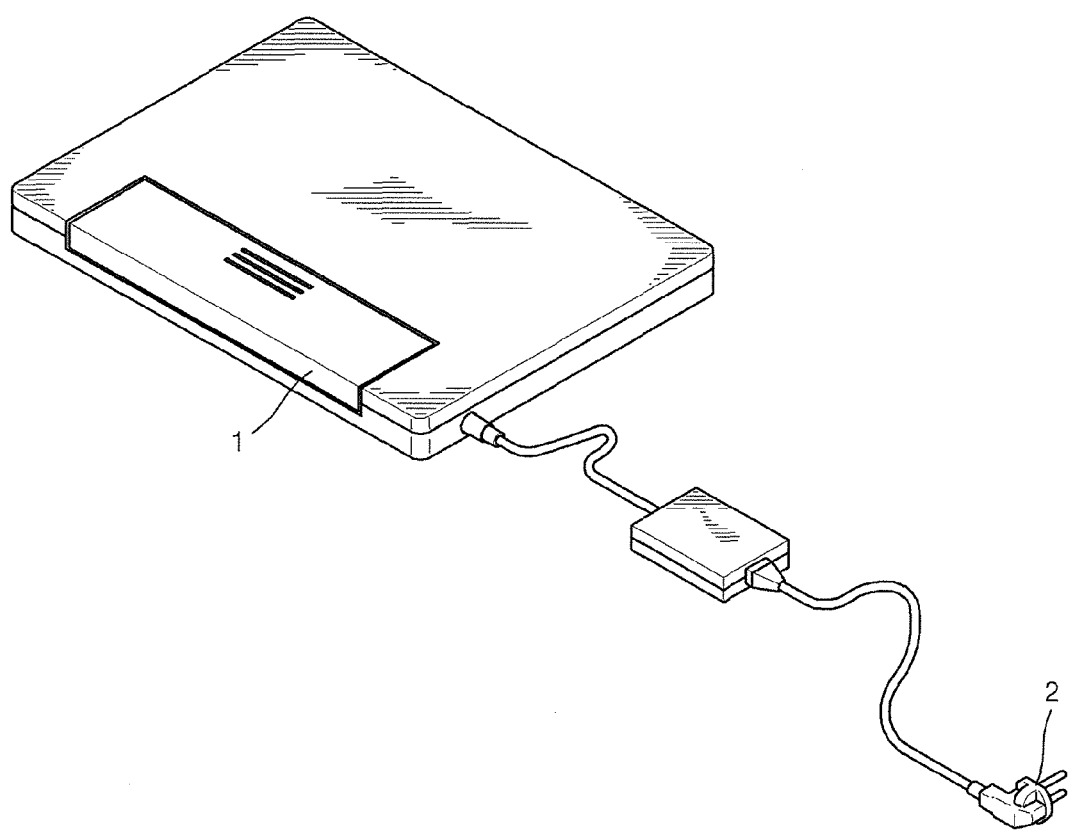
FIG. 1 illustrates an electronic device (e.g., a notebook) including a battery pack according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are described below, by referring to the figures, to explain aspects of the present description. Also, when an element is referred to as being "coupled to" another element, it may be directly coupled to the other element, or may alternatively be indirectly coupled to the other element with one or more intervening elements interposed therebetween.

FIG. 1 illustrates an electronic device (e.g., a notebook) including a battery pack 1 according to an embodiment of the present invention.

Referring to FIG. 1, the electronic device (e.g., a portable electronic device, e.g., a notebook, which may be manufactured to be conveniently used in temporary spaces) may be alternating-current (AC) powered using an adapter 2 or may be battery-powered without the adapter 2. The battery pack 1 may be charged using the adapter 2. In an embodiment, when the notebook is AC-powered using the adapter 2 for more than a first reference time, the notebook (or the battery pack) may be referred to as being in an AC user mode, and when the notebook is being powered from the battery pack 1 for more than the first reference time, the notebook (or the battery pack) may be referred to as being in a battery user mode.

Figure 2:
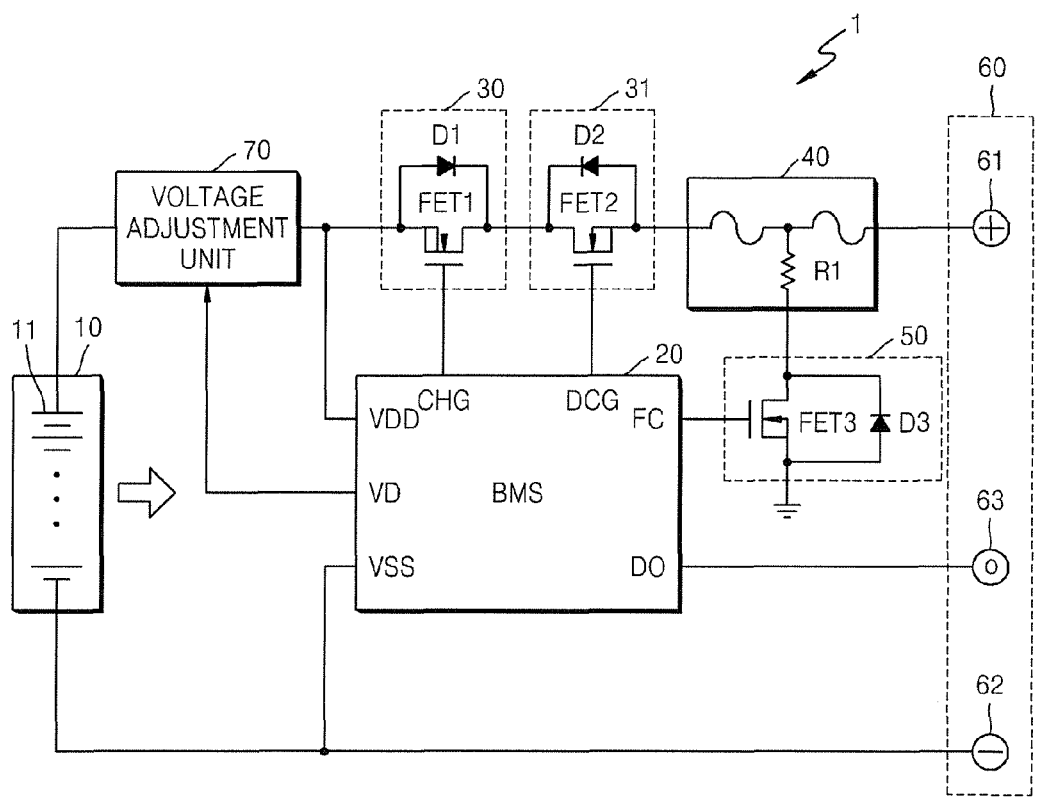
FIG. 2 is a circuit diagram of a battery pack according to an embodiment of the present invention.

FIG. 2 is a circuit diagram of the battery pack 1 according to an embodiment of the present invention. Referring to FIG. 2, the battery pack 1 includes a battery 10, a battery management system (BMS) 20, a charge control switch 30, a discharge control switch 31, a fuse 40, a fuse control switch 50, a terminal unit 60, and a voltage adjustment unit 70.

The battery 10 may supply stored power to the electronic device in which the battery pack 1 is installed. Referring to FIG. 1, the battery 10 may be installed in the notebook and may supply power to the notebook. Also, if a charger is coupled (e.g., connected) to the battery pack 1, the battery 10 may be charged with external power (e.g., AC power). Referring to FIG. 1, the battery 10 may be charged by the adapter 2. The battery 10 may include at least one battery cell 11. The battery cell 11 may be a rechargeable secondary battery, such as a nickel-cadmium battery, a lead storage battery, a nickel metal hydride battery (NiMH), a lithium ion battery, or a lithium polymer battery. But, the present application is not limited thereto, and the battery cell may be another suitable type of rechargeable battery.

In an embodiment, the BMS 20 controls charging and discharging of the battery 10, and performs a balancing control on a plurality of the battery cells 11 included in the battery 10. Also, the BMS 20 may receive a charge current value, and may calculate a state of charge (SOC) of the battery 10 by integrating the charge current value. The BMS 20 may determine a charge amount using the SOC.

In an embodiment, the BMS 20 counts a number of charging and discharging cycles of the battery 10 for the first reference time, determines a user type of the electronic device (e.g., a battery user type in which the battery 10 is primarily used, or an AC user type using the adapter 2), and reduces a charging voltage of the battery 10 according to the determined user type in a stepwise manner. Such an operation of the BMS 20 will be described in detail with reference to FIG. 3.

The BMS 20 may include a power terminal VDD to which a power voltage is applied, a ground terminal VSS to which a ground voltage is applied, a charge control terminal CHG, a discharge control terminal DCG, a fuse control terminal FC, a data output terminal DO, a voltage adjustment control signal output terminal VD, etc.

If the battery pack 1 malfunctions, the BMS 20 may generate a charge control signal for controlling an operation of the charge control switch 30 or a discharge control signal for controlling an operation of the discharge control switch 31. The charge control signal and the discharge control signal are respectively output to the outside through the charge control terminal CHG and the discharge control terminal DCG.

The BMS 20 may generate a fuse blowing signal for blowing a fuse 40 and the fuse blowing signal may be applied to the fuse control switch 50. The fuse blowing signal may output to the outside through the fuse control terminal FC.

The BMS 20 may transmit data about the charge amount of the battery 10, or various other data to the outside, for example, to the electronic device or the charger coupled to the battery pack 1 through the data output terminal DO.

The BMS 20 illustrated in FIG. 2 controls all components of the battery pack 1, but the structure of the BMS 20 is not limited thereto. For example, an analog front end (not shown) that monitors a state of the battery 10 and controls operations of the charge control switch 30 and the discharge control switch 31 may be further formed, with the BMS 20 controlling the analog front end.

If the battery pack 1 malfunctions, the BMS 20 may control the charge control switch 30 to block a charge current, and the BMS 20 may control the discharge control switch 31 to block a discharge current.

The charge control switch 30 may include a field effect transistor FET1 and a parasitic diode D1. The FET1 may be coupled such that a current flow from a positive terminal 61 to the battery 10 or a current flow from the battery 10 to a negative terminal 62 is blocked. That is, the flow of the charge current may be blocked by using the FET1. In this case, the FET1 is formed such that the discharge current flows through the parasitic diode D1.

The discharge control switch 31 may include a field effect transistor FET2 and a parasitic diode D2. The FET2 may be coupled such that a current flow from the negative terminal 62 to the battery 10 or a current flow from the battery 10 to the positive terminal 61 is blocked. That is, the flow of the discharge current may be blocked by using the FET2. In this case, the FET2 is formed such that the charge current flows through the parasitic diode D2. A connection direction of source and drain electrodes of the FET2 may be opposite to a connection direction of source and drain electrodes of the FET1.

Each of the charge control switch 30 and the discharge control switch 31 is a switching device and is not limited to a FET, and various other devices that perform a switching function may also be used as the charge control switch 30 and the discharge control switch 31.

The fuse 40 may be formed between the battery 10 and the terminal unit 60 on a high-current path through which a relatively high current flows. If the battery pack 1 malfunctions, the fuse 40 may be blown to block the flow of the charge current or the discharge current. The fuse 40 may include a resistor R1 coupled to the high-current path and a ground. If a current equal to or higher than a current reference value (e.g., a suitable current value) flows through the resistor R1, the fuse 40 melts due to heat generated at the resistor R1, thereby blocking the current flow.

In an embodiment, if the battery pack 1 malfunctions, first, the flow of the charge current or the discharge current is blocked by using the charge control switch 30 and/or the discharge control switch 31. However, if the malfunction of the battery pack 1 is not overcome despite of the controlling of the charge control switch 30 and/or the discharge control switch 31, the fuse 40 may be blown to block the current flow permanently. That is, the battery pack 1 may not be used permanently.

In an embodiment, the fuse control switch 50 allows a current to flow through the resistor R1 of the fuse 40 to blow the fuse 40. The fuse control switch 50 may be formed between the fuse 40 and the ground, and may receive the fuse blowing signal from the BMS 20 to turned on, thereby allowing the current to flow through the resistor R1. The fuse control switch 50 may include a field effect transistor FET3 and a parasitic diode D3.

The terminal unit 60 may connect the battery pack 1 to an external device. In this case, the external device may be an electronic device or a charger. The terminal unit 60 may include the positive terminal 61 and the negative terminal 62. Through the positive terminal 61, the charge current may enter and the discharge current may flow out. Through the negative terminal 62, the charge current may flow out and the discharge current may enter. Also, the terminal unit 60 may include an output terminal 63 that is coupled to the data output terminal DO of the BMS 20 to transmit data to the external device about the charge amount of the battery 10, various other data, or a control signal.

In an embodiment, the voltage adjustment unit 70 is formed on the high-current path and adjusts a voltage for charging the battery 10 using a voltage control signal output from the voltage adjustment control signal output terminal VD of the BMS 20.

The voltage adjustment unit 70 illustrated in FIG. 2 is in front of the charge control switch 30. However, the position of the voltage adjustment unit 70 is not limited thereto. That is, the voltage adjustment unit 70 may be located in any position as long as the voltage for charging the battery 10 can be adjusted. Also, in the battery pack 1 of FIG. 2, the voltage adjustment unit 70 and the BMS 20 are separately formed. However, in another embodiment, the voltage adjustment unit 70 may be included in the BMS 20.

Figure 3:
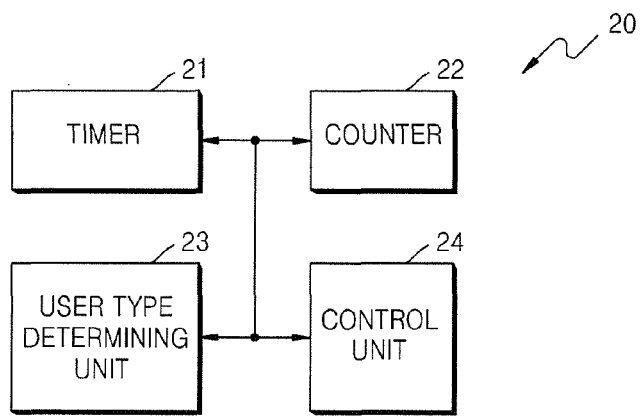
FIG. 3 is a block diagram of a battery management system (BMS) for controlling charging of the battery pack of FIG. 2.

FIG. 3 is a block diagram of the BMS 20 for controlling charging of the battery pack 1 of FIG. 2. Referring to FIG. 3, The BMS 20 may include a timer 21, a counter 22, a user type determining unit 23 (e.g., a user type determiner), and a control unit 24 (e.g., a controller).

The timer 21 measures an available time of the battery 10. The counter 22 counts charging and discharging cycles of the battery 10.

The user type determining unit 23 determines the user type from an increased number of charging and discharging cycles of the battery 10 counted by the counter 22 for the first reference time (e.g., 240 hours).

In an embodiment, the user type determining unit 23 determines the battery user mode indicating that the electronic device is driven using the battery 10 if the increased number (e.g., 3) of charging and discharging cycles of the battery 10 counted by the counter 22 for the first reference time (e.g., 240 hours), is greater than a reference number (e.g., 2).

In an embodiment, the user type determining unit 23 determines the AC user mode indicating that the electronic device is AC-driven using the adapter 2 if the increased number (e.g., 0 or 1) of charging and discharging cycles of the battery 10 counted by the counter 22 for the first reference time (e.g., 240 hours) is less than the reference number (e.g., 2).

The control unit 24 may output a control signal for reducing the charging voltage of the battery 10 in the stepwise manner according to the user type determined by the user type determining unit 23 to the voltage adjustment unit 70.

In an embodiment, in the battery user mode, the control unit 24 outputs the control signal for reducing the charging voltage of the battery 10 in the stepwise manner every charging and discharging cycle to the voltage adjustment unit 70, and updates the reduced charging voltage. For example, in an embodiment, if a voltage (i.e., a first reference voltage) for fully charging the battery 10 is 4.2V, the control unit 24 may output a control signal for reducing the charging voltage of the battery 10 by 0.1 mV every charging and discharging cycle. In this example, the battery 10 is initially charged with 4.2V, when a charging and discharging cycle is complete one time, the battery is charged with 4.19V, and when the charging and discharging cycle is completed a second time, the battery is charged with 4.18V, etc.

While the charging voltage of the battery 10 may be reduced (e.g., reduced by 0.1 mV) every charging and discharging cycle while in the battery user mode, the present embodiment is not limited thereto. For example, the control unit 24 may calculate a final charging voltage and a reduction voltage according to Equation 1 below.

$$\text{final charging voltage} = \text{first reference voltage} - \left(\frac{\text{number of charging and discharging cycles}}{\text{reference number of cycles}} \times \text{final reduction voltage}\right)$$

$$\text{reduction voltage} = \frac{\text{final reduction voltage}}{\text{reference number of cycles}}$$

Equation 1

In an embodiment, when the charging voltage of the battery 10 is reduced in the stepwise matter in this way, and the increased number of charging and discharging cycles (e.g., the total number of charging and discharging cycles) is greater than or equal to a reference number of cycles, the control unit 24 stops the operation of reducing the charging voltage of the battery 10 and outputs a control signal for maintaining a constant charging voltage, for example, a charging voltage of a previous step, to the voltage adjustment unit 70. In an embodiment, the reference number of cycles may be, for example, 300 cycles, which may be a guaranteed cycle number of a general battery pack.

In an embodiment, in the AC user mode, the control unit 24 outputs the control signal for reducing the charging voltage of the battery 10 in the stepwise manner every update time (e.g., every 4 hours) to the voltage adjustment unit 70, and updates the reduced charging voltage. For example, in an embodiment, if the voltage (i.e., the first reference voltage) for fully charging the battery 10 is 4.2V, the control unit 24 may output a control signal for reducing the charging voltage of the battery 10 by 0.1 mV every update time (e.g., every 4 hours). In this example, the battery 10 is initially charged with 4.2V, after the first 4 hours, the battery 10 is charged with 4.19V, and after the second 4 hours, the battery 10 is charged with 4.18V.

While the charging voltage of the battery 10 may be reduced (e.g., reduced by 0.1 mV) every update time (e.g., every 4 hours) while in the AC user mode, the present embodiment is not limited thereto. For example, the control unit 24 may calculate the final charging voltage and the reduction voltage according to Equation 1 below.

$$\text{final charging voltage} = \text{first reference voltage} - \left(\frac{\text{elapsed time/update time}}{\text{second reference time}} \times \{\text{final reduction voltage} \times \text{update time}\}\right)$$

$$\text{reduction voltage} = \frac{\text{final reduction voltage} \times \text{update time}}{\text{second reference time}}$$

Equation 2

In an embodiment, when the charging voltage of the battery 10 is reduced in the stepwise matter in this way, and an availability time of the battery 10 (e.g., an elapsed time in the AC user mode) is greater than or equal to a second reference time, the control unit 24 stops the operation of reducing the charging voltage of the battery 10 and outputs the control signal for maintaining the constant charging voltage, for example, the charging voltage of the previous step, to the voltage adjustment unit 70. In an embodiment, the second reference time may be, for example, 1 year, which may be a guaranteed time of the general battery pack.

In this way, the availability time of the battery 10 may increase while an initial capacity thereof may be maintained.

Figure 4:
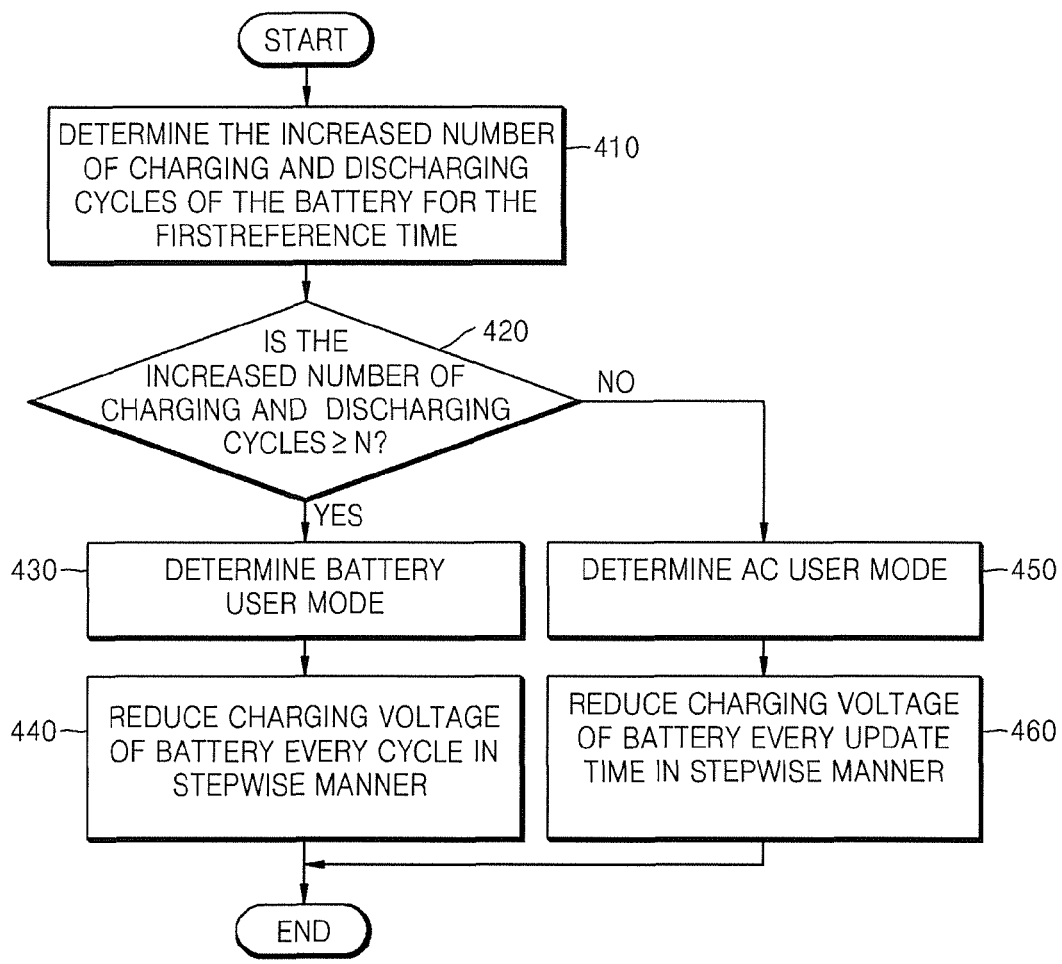
FIG. 4 is a flowchart of a method of controlling charging of a battery according to an embodiment of the present invention.

FIG. 4 is a flowchart of a method of controlling charging of the battery 10 according to an embodiment of the present invention.

Referring to FIG. 4, the BMS 20 determines the increased number of charging and discharging cycles of the battery 10 for the first reference time (for example, 240 hours) (operation 410).

In one embodiment, the BMS 20 determines whether or not the increased number of charging and discharging cycles of the battery 10 during the first reference time is greater than a reference number N (N being a natural number, e.g., a suitable number) (operation 420). If the increased number of charging and discharging cycles of the battery 10 for the reference time is greater than N, the BMS 20 determines that the user type is the battery user type (i.e., that the battery pack is in the battery user mode) (operation 430). For example, in an embodiment where the first reference time is 240 hours and N is 2, if the BMS 20 determines the increased number of charging and discharging cycles of the battery 10 during the 240 hour reference time to be 3, the BMS 20 will determine that the battery pack is in the battery user mode indicating that the electronic device is currently driven using the battery 10.

In an embodiment, in the battery user mode, the BMS 20 outputs the control signal for reducing the charging voltage of the battery 10 every charging and discharge cycle in the stepwise manner to the voltage adjustment unit 70, and updates the reduced charging voltage (operation 440).

In an embodiment, if the BMS 20 determines that the increased number of charging and discharging cycles of the battery 10 during the first reference time is less than N, the BMS 20 determines that the user type is the AC user type (i.e., that the battery pack is in the AC user mode) (operation 450). For example, in an embodiment where the first reference time is 240 hours and N is 2, if the BMS 20 determines the increased number of charging and discharging cycles of the battery 10 during the 240 hour reference time to be 0 or 1, the BMS 20 will determine that the battery pack is in the AC user mode indicating that the electronic device is currently driven using the adapter 2.

In an embodiment, in the AC user mode, the BMS 20 outputs the control signal for reducing the charging voltage of the battery 10 every update time (e.g., a determined time, e.g., a suitable time) in the stepwise manner to the voltage adjustment unit 70 and updates the reduced charging voltage (operation 460).

Figure 5:
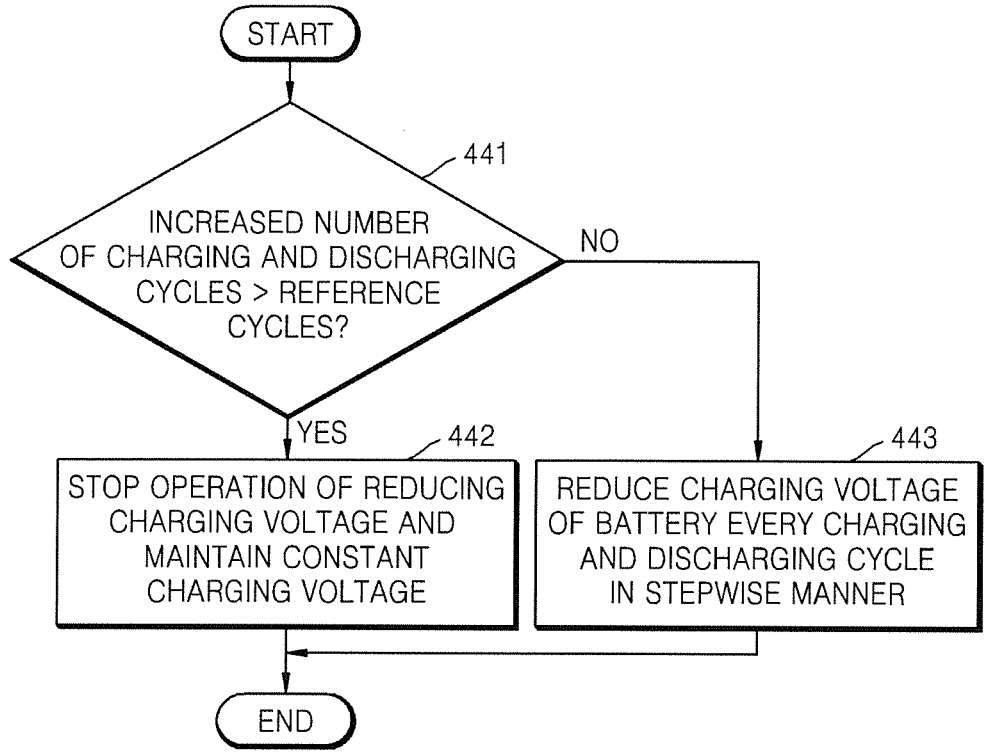
FIG. 5 is a flowchart of a method of stopping a reduction in a charging voltage of the battery in a battery user mode in the method of FIG. 4.

FIG. 5 is a flowchart of a method of stopping the reduction in the charging voltage of the battery 10 in the battery user mode in the method of FIG. 4.

If the charging voltage of the battery 10 is continuously reduced, it may be reduced to a voltage at which the battery 10 is not chargeable. To prevent (or substantially reduce the likelihood of) this from occurring, the charging voltage of the battery 10 may be reduced to a reference value (e.g., the final reduction voltage), thereafter a further reduction in the charging voltage thereof may be stopped, and a constant voltage, for example, a charging voltage of the previous step, may be maintained.

Referring to FIG. 5, in an embodiment, the BMS 20 determines whether the increased number of charging and discharging cycles (e.g., the total number of charging and discharging cycles) of the battery 10 exceeds a reference number of cycles (operation 441). If the BMS 20 determines that the increased number of the charging and discharging cycles of the battery 10 exceeds the reference number of cycles, the BMS 20 stops the operation of reducing the charging voltage of the battery 10, and outputs the control signal for maintaining the constant charging voltage (e.g., the charging voltage of the previous step) to the voltage adjustment unit 70 (operation 442).

In an embodiment, if the BMS 20 determines that the increased number of the charging and discharging cycles of the battery 10 does not exceed the reference number of cycles, the BMS 20 outputs the control signal for reducing the charging voltage of the battery 10 every charging and discharging cycle in the stepwise manner to the voltage adjustment unit 70 (operation 443).

Figure 6:
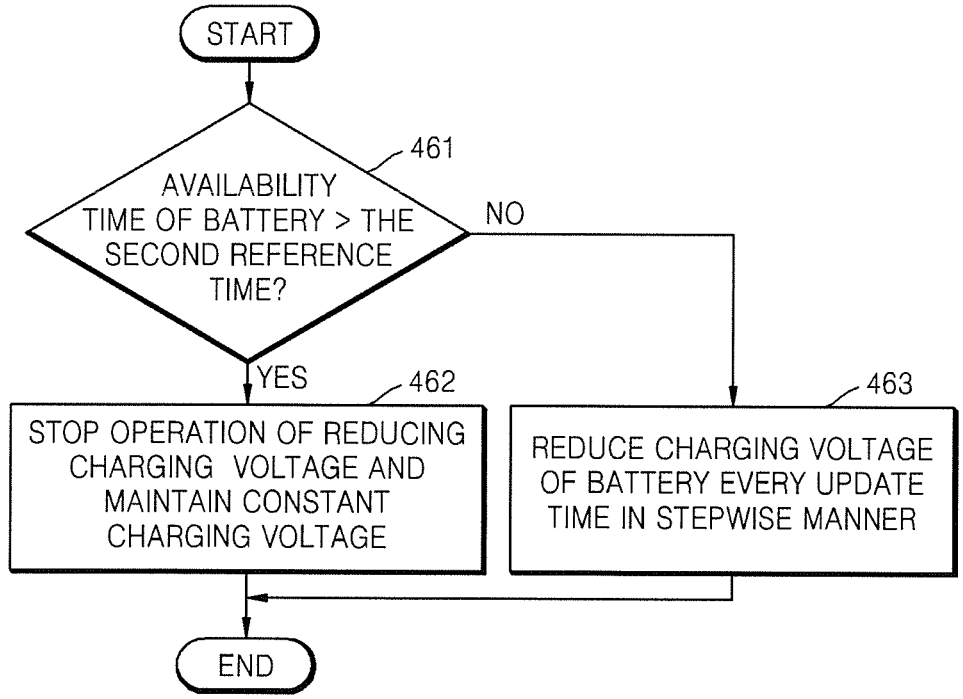
FIG. 6 is a flowchart of a method of stopping a reduction in the charging voltage of the battery in an AC user mode in the method of FIG. 4.

FIG. 6 is a flowchart of an embodiment of a method of stopping the reduction in the charging voltage of the battery 10 in the AC user mode in the method of FIG. 4.

Referring to FIG. 6, the BMS 20 determines whether the availability time (e.g., the elapsed time) of the battery 10 exceeds the second reference time (operation 461). If the BMS 20 determines that availability time of the battery 10 exceeds the second reference time, the BMS 20 stops the operation of reducing the charging voltage of the battery 10, and outputs the control signal for maintaining the constant charging voltage (e.g., the charging voltage of the previous step) to the voltage adjustment unit 70 (operation 462).

In an embodiment, if the BMS determines that the availability time of the battery 10 does not exceed the second reference time, the BMS 20 outputs the control signal for reducing the charging voltage of the battery 10 every update time in the stepwise manner to the voltage adjustment unit 70 (operation 463).

In this way, the availability time of the battery 10 may increase while the initial capacity thereof may be maintained.

As described above, according to the one or more of the above embodiments of the present invention, a user type of a battery is determined, a charging voltage of the battery is adjusted according to the determined user type of the battery, and thus an availability time of the battery increases while an initial capacity of the battery is maintained.

It should be understood that the exemplary embodiments described herein should be considered in a descriptive sense only and not for purposes of limitation. Descriptions of features or aspects within each embodiment should typically be considered as available for other similar features or aspects in other embodiments. As such, it is to be understood that the invention is not limited to the disclosed embodiments, but instead is intended to cover various modifications and equivalent arrangements included within the spirit and scope of the appended claims, and equivalents thereof.

What is claimed is:

1. A method of controlling charging of a battery, the method comprising:
   counting, by a battery management unit, an increased number of charging and discharging cycles of the battery for a first reference time;
   determining, by the battery management unit, a user mode of the battery according to the counted increased number of charging and discharging cycles; and
   reducing, by the battery management unit, a charging voltage of the battery from a first reference voltage to a second reference voltage in a stepwise manner according to the determined user mode,
   wherein the determining, by the battery management unit, of the user mode comprises:
      determining the user mode to be a battery user mode in which an electric device is driven by the battery when the increased number of charging and discharging cycles of the battery for the first reference time is greater than N; and
      determining the user mode to be an AC user mode in which the electric device is driven by an alternating current using an adapter when the increased number of charging and discharging cycles of the battery for the first reference time is smaller than N,
   wherein N is a natural number,
   wherein the first reference voltage is an initial voltage for charging the battery,
   wherein the second reference voltage is a final voltage for charging the battery,
   wherein the first reference time is a time with a preset duration, and
   wherein a second reference time is a time with a preset duration and is greater than the first reference time.

2. The method of claim 1, wherein the first reference voltage is a voltage for fully charging the battery.

3. The method of claim 1, wherein the second reference voltage is a charging voltage when a total number of charging and discharging cycles of the battery is greater than or equal to a reference number of cycles.

4. The method of claim 1, wherein the second reference voltage is a charging voltage when an elapsed time in the AC user mode of the battery is greater than or equal to the second reference time.

5. The method of claim 1, further comprising:
   if the determined user mode is the battery user mode, and a total number of the charging and discharging cycles of the battery is greater than or equal to a reference number of cycles, maintaining a constant charging voltage and stopping the operation of reducing the charging voltage of the battery.

6. The method of claim 1, further comprising:
   if the determined user mode is the AC user mode and an availability time of the battery is greater than or equal to the second reference time, maintaining a constant charging voltage and stopping the operation of reducing the charging voltage of the battery.

7. A battery pack comprising:
   a battery;
   a voltage adjustment unit for adjusting a charging voltage of the battery; and
   a battery management unit for determining a user mode of the battery, and outputting a control signal for reducing the charging voltage of the battery in a stepwise manner according to the determined user mode to the voltage adjustment unit,
   wherein the determined user mode is a battery user mode when an increased number of charging and discharging cycles of the battery for a first reference time is greater than N,
   the determined user mode is an AC user mode when the increased number of charging and discharging cycles of the battery for the first reference time is smaller than N,
   N is a natural number, and
   wherein the first reference time is a time with a preset duration.

8. The battery pack of claim 7, wherein
   the battery management unit is configured to output a control signal for maintaining a constant charging voltage when the determined user mode is the battery user mode and a total number of charging and discharging cycles of the battery is greater than or equal to a reference number of cycles.

9. The battery pack of claim 7, wherein
   the battery management unit is configured to output a control signal for maintaining a constant charging voltage when the determined user mode is the AC user mode and an elapsed time in the AC user mode of the battery is greater than or equal to a second reference time,
   wherein the second reference time is a time with a preset duration and is greater than the first reference time.

10. The battery pack of claim 7, wherein the battery management unit comprises:
    a timer for measuring an availability time of the battery;
    a counter for counting charging and discharging cycles of the battery;
    a user mode determiner for determining the user mode of the battery from an increased number of charging and discharging cycles of the battery counted by the counter for the first reference time; and
    a controller for outputting the control signal for reducing the charging voltage of the battery from a first reference voltage to a second reference voltage in the stepwise manner according to the determined user mode to the voltage adjustment unit,
    wherein the first reference voltage is an initial voltage for charging the battery, and
    wherein the second reference voltage is a final voltage for charging the battery.

11. The battery pack of claim 10, wherein the first reference voltage is a voltage for fully charging the battery.

12. The battery pack of claim 10, wherein the second reference voltage is a charging voltage when a total number of charging and discharging cycles of the battery is greater than or equal to a reference number of cycles.

13. The battery pack of claim 10, wherein the second reference voltage is a charging voltage when the availability time of the battery is greater than or equal to a second reference time.

\* \* \* \* \*